United States Patent
Kim et al.

(10) Patent No.: US 12,013,964 B2
(45) Date of Patent: Jun. 18, 2024

(54) METHOD FOR DETERMINING DATA TAMPERING AND ELECTRONIC DEVICE FOR SUPPORTING THE SAME

(71) Applicant: SAMSUNG ELECTRONICS CO., LTD., Suwon-si (KR)

(72) Inventors: Jungyoon Kim, Suwon-si (KR); Seongjin An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 614 days.

(21) Appl. No.: 17/259,086

(22) PCT Filed: Jun. 19, 2019

(86) PCT No.: PCT/KR2019/007370
§ 371 (c)(1),
(2) Date: Jan. 8, 2021

(87) PCT Pub. No.: WO2020/013470
PCT Pub. Date: Jan. 16, 2020

(65) Prior Publication Data
US 2021/0271774 A1    Sep. 2, 2021

(30) Foreign Application Priority Data
Jul. 10, 2018   (KR) .................. 10-2018-0079758

(51) Int. Cl.
*G06F 21/62*    (2013.01)
*G06F 3/0482*   (2013.01)
(Continued)

(52) U.S. Cl.
CPC ........ *G06F 21/6245* (2013.01); *G06F 3/0482* (2013.01); *G06F 3/0488* (2013.01);
(Continued)

(58) Field of Classification Search
CPC .......... G06F 21/64; G06F 3/0482; G06F 9/54; G06F 21/552; G06F 12/0875; G06F 3/0488; G06F 21/6245; G06F 2212/1052
See application file for complete search history.

(56) References Cited

U.S. PATENT DOCUMENTS 6,950,817 B1 *  9/2005  Bernard ................ G06F 16/284
8,448,260 B1 *  5/2013  Hansen ................. G06F 21/62
                                                726/28

(Continued)

FOREIGN PATENT DOCUMENTS

JP    2008-217449    9/2008
KR    10-2009-0019484    2/2009

OTHER PUBLICATIONS

International Search Report for PCT/KR2019/007370 dated Oct. 14, 2019, 4 pages.
(Continued)

*Primary Examiner* — Mohammad A Siddiqi
(74) *Attorney, Agent, or Firm* — Nixon & Vanderhye, P.C.

(57) ABSTRACT

The present disclosure provides an electronic device including a touch screen display, at least one processor, and a memory, in which the memory stores a first application program including a user interface, and stores instructions that, with regard to execution of the first application, cause the at least one processor to execute the first application program, and display content on the touch screen display in response to the execution of the first application program, receive a first user input for selecting at least a portion of the content using the user interface, receive a second user input for adding at least a portion of the selected content to a clipboard using the user interface, check whether or not the application program associated with the second user input is the first application program, and allow or block the addition
(Continued)

of the selected content to the clipboard based at least in part on the check. In addition to the above, various embodiments identified through the specification are possible.

8 Claims, 10 Drawing Sheets

(51) Int. Cl.
 G06F 3/0488 (2022.01)
 G06F 12/0875 (2016.01)
 G06F 21/64 (2013.01)
(52) U.S. Cl.
 CPC .......... *G06F 12/0875* (2013.01); *G06F 21/64* (2013.01); *G06F 2212/1052* (2013.01)

(56) References Cited

U.S. PATENT DOCUMENTS

| | | | |
|---|---|---|---|
| 9,218,499 B2 | 12/2015 | Furuichi et al. | |
| 9,672,366 B1 | 6/2017 | Khetawat et al. | |
| 9,727,707 B2 | 8/2017 | Bowles | |
| 9,851,918 B2 * | 12/2017 | Tsirkin | G06F 3/0647 |
| 10,642,727 B1 * | 5/2020 | Volpe | G06F 12/0238 |
| 2008/0256601 A1 * | 10/2008 | Dutta | G06F 21/6209 726/3 |
| 2010/0260152 A1 * | 10/2010 | Englund | H04W 8/04 370/336 |
| 2012/0166737 A1 * | 6/2012 | Furuichi | G06F 21/6209 711/147 |
| 2015/0026620 A1 * | 1/2015 | Kwon | G06F 3/04886 715/770 |
| 2015/0135300 A1 * | 5/2015 | Ford | G06Q 50/18 726/11 |
| 2015/0143534 A1 | 5/2015 | Bowles | |
| 2016/0364201 A1 * | 12/2016 | Beveridge | G06F 9/452 |
| 2017/0180427 A1 | 6/2017 | Kashap et al. | |
| 2017/0235483 A1 * | 8/2017 | Alonso Ruiz | G06F 3/04883 715/773 |
| 2017/0337357 A1 | 11/2017 | Bowles | |

OTHER PUBLICATIONS

Written Opinion of the ISA for PCT/KR2019/007370 dated Oct. 14, 2019, 7 pages.

* cited by examiner

METHOD FOR DETERMINING DATA TAMPERING AND ELECTRONIC DEVICE FOR SUPPORTING THE SAME

This application is the U.S. national phase of International Application No. PCT/KR2019/007370 filed Jun. 19, 2019 which designated the U.S. and claims priority to KR Patent Application No. 10-2018-0079758 filed Jul. 10, 2018, the entire contents of each of which are hereby incorporated by reference.

BACKGROUND

Field

Various embodiments disclosed in the disclosure relate to a technique for operating a clipboard function of an electronic device.

Description of Related Art

In recent years, with the rapid spread of electronic devices equipped with their own operating system, the electronic devices are providing various functions or services that promote user convenience. For example, the electronic device may support a so-called clipboard function for pasting content, which is selected by a user on an interface presented by execution of an application program, on an interface of the same application program or a different application program.

SUMMARY

Content data selected by the user with regard to the operation of the clipboard function may include sensitive information (or information requiring security) such as user personal information or financial transaction information. According to the above, if the selected content data is tampered with by a malicious program or the like, security issues such as leakage or theft of the sensitive information may occur, and thus countermeasures are required.

Various embodiments disclosed in the present disclosure may provide a method for determining data tampering and an electronic device for supporting the same, capable of determining whether or not content data selected by a user is tampered with during a clipboard function operation to allow or block storage of the content data on the clipboard.

According to an aspect of the present disclosure, there may be provided an electronic device including a touch screen display, at least one processor operatively connected with the touch screen display, and a memory operatively connected with the at least one processor.

According to the aspect, the memory may store a first application program including a user interface.

According to the aspect, the memory may store instructions that, when executed, cause the at least one processor to execute the first application program, and display content on the touch screen display in response to the execution of the first application program, receive a first user input for selecting at least a portion of the content using the user interface, receive a second user input for adding at least a portion of the selected content to a clipboard using the user interface, check whether or not the application program associated with the second user input is the first application program, and allow or block the addition of the selected content to the clipboard based at least in part on the check.

According to the aspect, the at least one processor may be configured to display the user interface including content in response to the execution of the application program, receive a user input for storing at least a portion of the content in a clipboard, determine whether or not the at least a portion of the content data is tampered with based on at least one item of information regarding the user input, store the at least a portion of the content data in the clipboard if it is determined that the at least a portion of the content data is not tampered with, and output a notification indicating that the at least a portion of the content data is tampered without storing the at least a portion of the content data in the clipboard if it is determined that the at least a portion of the content data is tampered with.

According to various embodiments, by determining data tampering to allow or block the storage of the data in a clipboard, it is possible to prevent various security issues or data tampering by malicious programs during a data operation.

According to various embodiments, by providing a notification through a user interface when data tampering is confirmed, it is possible to support a user to intuitively recognize the event.

Besides, various effects may be provided that are directly or indirectly identified through the present disclosure.

DETAILED DESCRIPTION

Figure 1:
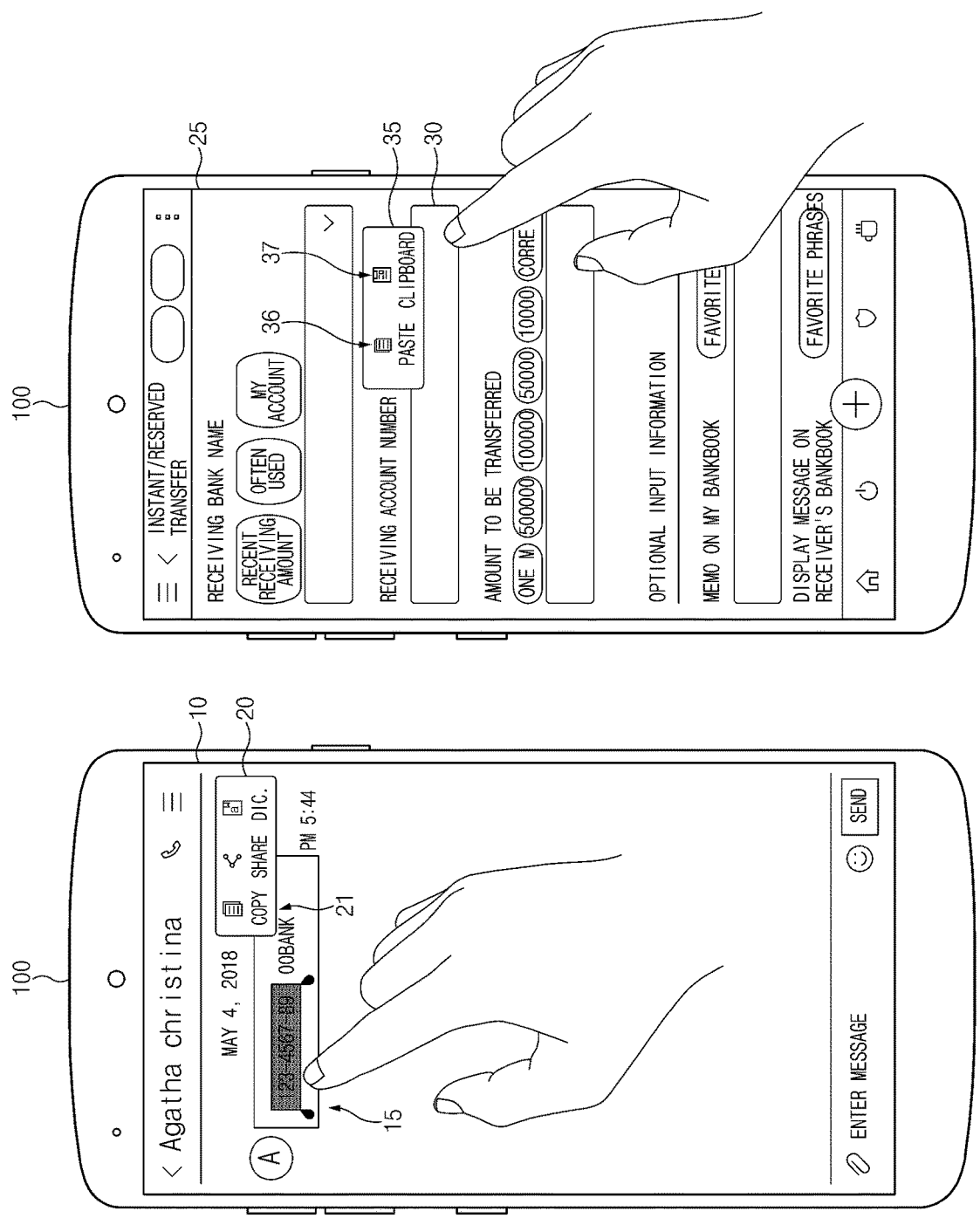
FIG. 1 is a diagram illustrating an example of a clipboard function operation of an electronic device according to an embodiment.

Hereinafter, various embodiments disclosed in the present disclosure will be described with reference to the accompanying drawings. However, this is not intended to limit the present disclosure to the specific embodiments, and it is to be construed to include various modifications, equivalents, and/or alternatives of embodiments of the present disclosure. With regard to the description of the drawings, similar reference numerals may be used to refer to similar elements.

As used here, terms and phrases such as "have", "may have", "include", or "may include" indicates the existence of features (e.g., numbers, functions, actions, or parts such as components), and do not exclude the existence of additional features.

As used here, the phrases "A or B", "at least one of A or/and B", or "one or more of A or/and B" may include all possible combinations of the items listed together. For example, "A or B", "at least one of A and B", or "at least one of A or B" may indicate all of (1) including at least one A, (2) including at least one B, or (3) including both at least one A and at least one B.

As used here, the terms such as "first", "second", "the first", or "the second" may modify various components, regardless of order and/or importance, and are used to distinguish one component from another, but does not limit the components. For example, the first user device and the second user device may indicate different user devices regardless of order or importance. For example, without departing from the teachings disclosed in the present disclosure, a first element could be termed a second element, and similarly, in reverse, a second element could be termed a first element.

When a component (e.g., a first component) is referred to as being "(operatively or communicatively) coupled with/to" or "connected to" another component (e.g., a second component), it should be understood that any of the above components may be directly connected to another component, or may be connected via another component (e.g., a third component). In contrast, when a certain component (e.g., the first component) is referred to as being "directly coupled" or "directly connected" to another component (e.g., the second component), it is to be understood that no other component (e.g., the third component) intervenes between the certain component and the other component.

As used here, the phrase, "configured to (or set to)", may be interchangeably used with, for example, "suitable for", "having the capacity to", "designed to", "adapted to", "made to", or "capable of", depending on the circumstances. The phrase "configured (or set) to" may not necessarily mean only "specifically designed to" in hardware. Rather, in some circumstances, the phrase "device configured to" may mean that the device "can" perform an operation with other devices or parts. For example, the phrase "processor configured (or set) to perform A, B, and C" may mean a dedicated processor (e.g., an embedded processor) for performing corresponding operations, or a generic-purpose processor (e.g., a CPU or an application processor) that performs the operations by executing one or more software programs stored in a memory device.

The terms and phrases as used herein are merely provided to describe specific embodiments, and may not be intended to limit the scope of other embodiments. A singular form is intended to include a plural form, unless the context clearly indicates otherwise. Terms, including technical or scientific terms, as used here, may have the same meaning as commonly understood by a person skilled in the art to which the embodiments of the present disclosure belong. Terms such as those defined in commonly-used dictionaries should be interpreted as having a meaning that is consistent with their meaning in the context of the relevant art and will not be interpreted in an idealized or overly formal sense unless expressly so defined here. In some cases, even terms defined here cannot be interpreted to exclude embodiments of the present disclosure.

Examples of an electronic device according to various embodiments of the present disclosure may include at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device. According to various embodiments, the wearable device may include at least one of an accessory-type device (e.g., watches, rings, bracelets, anklets, necklaces, glasses, contact lenses, or head-mounted devices (HMD), a textiles or clothing integrated-type device (e.g., electronic clothing), a body attachment-type device (e.g., skin pads or tattoo), or a bio-implantable-type device (implantable circuits).

In some embodiments, the electronic device may be a home appliance. The home appliance may include at least one of, for example, a television, a digital video disk (DVD) player, an audio device, a refrigerator, an air conditioner, a cleaner, an oven, a microwave, a washing machine, an air purifier, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or a digital photo frame.

In another embodiment, the electronic device may include at least one of various medical devices (e.g., various portable medical measurement devices (such as a blood glucose meter, a heart rate monitor, a blood pressure meter, or a body temperature meter), magnetic resonance angiography (MRA), magnetic resonance imaging (MRI), computed tomography (CT), imaging device, a ultrasound machine, and the like), a navigation device, a global navigation satellite system (GNSS), an event data recorder (EDR), a flight data recorder (FDR), a vehicle infotainment device, an electronic device for a ship (e.g., a navigation device for a ship, a gyro-compass, and the like), avionics, a security device, an automotive head unit, a robot for home or industry, an automatic teller's machine (ATM) in banks, point of sales in a shop, or an Internet-of-things device (a light bulb, various sensors, an electric or gas meter, a sprinkler device, a fire alarm, a thermostat, a streetlamp, a toaster, a sporting goods, a hot water tank, a heater, a boiler, and the like).

According to some embodiments, the electronic device may include at least one of a part of furniture or a building/structure, an electronic board, an electronic signature receiving device, a projector, or various measuring devices (e.g., a water meter, an electric meter, a gas meter, or radio wave meter, and the like). In various embodiments, the electronic device may one or a combination of two or more of the various devices described above. The electronic device according to some embodiments may be a flexible electronic device. Further, the electronic device according to an embodiment of the present disclosure is not limited to the above-described devices, and may include a new electronic device accompanying technological development.

Hereinafter, an electronic device according to various embodiments will be described with reference to the accompanying drawings. In the present disclosure, the term user may refer to a person using an electronic device or a device using the electronic device (e.g., an artificial intelligence electronic device).

FIG. 1 is a diagram illustrating an example of a clipboard function operation of an electronic device according to an embodiment.

Referring to FIG. 1, an electronic device 100 may execute a first application program (e.g., a message application program) corresponding to user control or specified scheduling information from among at least one application program loaded or installed thereon. In the operation, the electronic device 100 may output a user interface 10 supported by the first application program through a display. In various embodiments, the user interface 10 may be a main screen of the first application program, a screen related to a function or service operation of the first application program, and may contain at least one item of content.

In an embodiment, the electronic device 100 copies or partially cuts out data related to at least one item of content included in the user interface 10 to store it in a temporary storage space (or a separate storage device) in a memory, and may support a clipboard function for loading the stored content data in response to a user request. In this regard, the electronic device 100 may receive a user input 15 for operating the clipboard function. For example, the electronic device 100 may receive a long press input applied to at least a portion of a specific content on the user interface 10 of the first application program for a specified time or longer. In this case, the electronic device 100 may display at least a portion of the specific content selected by the user (or to which the user input 15 is applied) with a color, and may output a first object 20 (a virtual screen component displayed on the display) that supports the operation of the clipboard function with respect to the content data. According to an embodiment, the first object 20 may include a copy tab button 21 related to the clipboard function operation. According to an embodiment, the first object 20 may further include at least one tap button (e.g., a share tap button or a dictionary tap button) for sharing or searching for the selected specific content. The electronic device 100 may store the data of the specific content in a temporary storage space (or a separate storage device) in the memory in response to a user input (e.g., a touch input) applied to the copy tab button 21.

In an embodiment, the electronic device 100 may receive the user input for operating content data stored in a temporary storage space (or separate storage device) in the memory, on the user interface 10 of the first application program or the user interface 25 of a second application program different from the first application program (e.g., a bank application program). For example, the electronic device 100 may receive a long press input applied to at least a portion of an input field 30 included in the user interface 10 or 25 for a specified time or longer. In this case, the electronic device 100 may output a second object 35 specified as an adjacent region of the input field 30. In an embodiment, the second object 35 may include a paste tab button 36 for loading content data that has been stored immediately before in the temporary storage space (or the separate storage device) and displaying the content data in the input field 30. Alternatively, in addition to the paste tab button 36, the second object 35 may further include a clipboard tap button 37 for supporting outputting of a list of at least one item of content data stored in the temporary storage space (or the separate storage device).

In an embodiment, the electronic device 100 may determine whether or not the content data selected by the user input 15 is tampered with or has a possibility of being tampered with, with regard to the stable operation of the clipboard function. The electronic device 100 may determine whether to operate the temporary storage space (or a separate storage device) based on the result of determining whether or not the content data is tampered with or has the possibility of being tampered with. For example, the electronic device 100 may block storage of the content data in the temporary storage space (or a separate storage device) if it is determined that the selected content data is tampered with or has the possibility of being tampered with. Alternatively, the electronic device 100 may support the operation of the clipboard function by storing the content data in the temporary storage space (or a separate storage device), if it is determined that the selected content data is not tampered with or does not have the possibility of being tampered with. Accordingly, the electronic device 100 may prevent various security issues or the installation of malicious programs that may occur due to data tampering. Hereinafter, various embodiments of the data tampering determination and functional operations of components of the electronic device 100 implementing the same will be described.

Figure 2A:
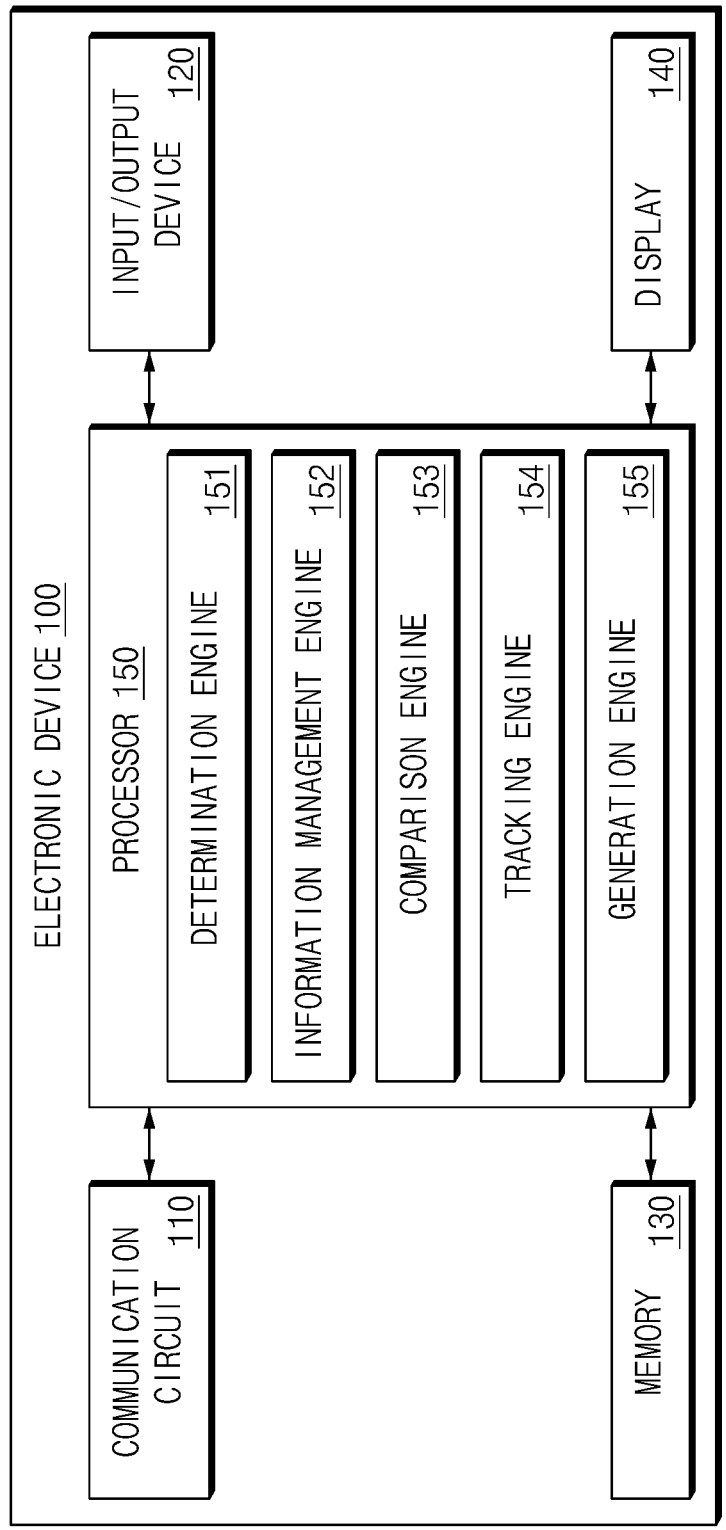
FIG. 2A is a diagram illustrating a configuration of an electronic device according to an embodiment.

FIG. 2A is a diagram illustrating a configuration of an electronic device according to an embodiment.

Referring to FIG. 2A, the electronic device 100 may include a communication circuit 110, an input/output device 120, a memory 130, a display 140, and a processor 150. According to various embodiments, the electronic device 100 may omit at least one of the above-mentioned components or may include other additional components. For example, the electronic device 100 may further include a power supply device (e.g., a battery) that supplies power to the components, a camera device (e.g., a front camera and/or a rear camera) that captures an image (e.g., a still image or a video) by photographing an area around the electronic device 100, a sensor device that senses various information about the operating environment of the electronic device 100 (e.g., a proximity sensor, an illuminance sensor, an acceleration sensor, a fingerprint sensor or an iris sensor, or the like), or the like. Alternatively, the electronic device 100 may further include components of an electronic device 901 to be referred to with reference to FIG. 9, which will be described later.

The communication circuit 110 may support communication between the electronic device 100 and at least one external device. For example, the communication circuit 110 may establish wired communication or wireless communication with the at least one external device according to a prescribed protocol, and may transmit and receive a signal or data to and from an external device based on the wired communication or wireless communication.

The input/output device 120 may receive or support a user input. For example, the input/output device 120 may receive a signal or data of the user input such as a voice input, a touch input, or a long press input, or may transmit the signal or data to the electronic device 100. According to an embodiment, the input/output device 120 may include a microphone, a speaker or a stylus pen mounted as an area of the electronic device 100, a software input panel (SIP) keyboard output by the electronic device 100, or an input/output interface (e.g., a port or a cable) that supports the connection between the electronic device 100 and an external input device (e.g., a keyboard, a mouse, or a touch pad). In various embodiments, at least a portion of the input/output device 120 (e.g., the microphone) is controlled to be always on, or may be activated by being triggered when a user input of a specified manner (long press input) is applied to the user interface of the above-described application program.

The memory 130 may store at least one signal or data related to the operation of the electronic device 100, or may store at least one instruction related to the functional operation of components of the electronic device 100. For example, the memory 130 may store data related to the operation of the clipboard function described above if it is determined that data is not tampered with (or if the clipboard function is normally called). In the operation, the data may be stored in a clipboard specified as a temporary storage space in the memory 130. Alternatively, the memory 130 may include a temporary memory (e.g., a cache memory) implemented by a separate device, and data may be stored in the temporary memory. In an embodiment, the memory 130 may include at least one application program that is mounted in a preloaded form in manufacturing the electronic device 100 or downloaded from an online market in a third party form.

The display 140 may output various screens. For example, the display 140 may output an execution screen of the at least one application program in response to user control or specified scheduling information. The execution screen of the application program may include at least one user interface that displays at least one item of content such as a text, an image, or a video. In an embodiment, the display 140 may be implemented as a touch screen display including a display panel, a cover glass, and a touch panel (or touch sensor). The display panel may include a display driver integrated circuit, and may output a related screen based on a driving signal having a specified frame rate which is transmitted from the display driver integrated circuit. The cover glass may be disposed over the display panel to transmit light from the screen output of the display panel. In addition, a user input (e.g., touch, drag, press, or the like) by the body of the user (e.g., finger) or a stylus pen may be applied to at least one region of the cover glass. The touch panel may detect a user input applied to the cover glass (e.g., capacitive detection, pressure-sensitive detection, infrared detection, ultrasonic detection, or the like), and may include a touch controller (e.g., a touch IC) that outputs the user input signal as an electrical signal and transmits it to the processor 150.

The processor 150 may be implemented as at least one of a central processing unit, an application processor, or a communication processor to control the components of the electronic device 100 described above. For example, the processor 150 may be electrically or operatively connected to the components of the electronic device 100 to transmit at least one instruction related to the function operations to the components, or to perform various operations, data processing, or the like. According to an embodiment, the processor 150 may determine whether to operate the clipboard or temporary memory included in the memory 130 by determining the stability of data related to the operation of the clipboard function. For example, the processor 150 may determine whether or not the data is tampered with or has a possibility of being tampered with, and may store the data in the clipboard or the temporary memory or exclude the storage according to the determination result. In an embodiment, the processor 150 may include at least one engine (e.g., a determination engine 151, an information management engine 152, a comparison engine 153, a tracking engine 154, a generation engine 155, or the like) with regard to determining whether or not the data is tampered with or has a possibility of being tampered with, and the functional operation of each of the at least one engine may be described later.

According to various embodiments, an electronic device according to an embodiment may include a touch screen display, at least one processor operatively connected with the touch screen display, and a memory operatively connected with the at least one processor, in which the memory may store a first application program including a user interface, and may store instructions that, when executed, cause the at least one processor to execute the first application program, and display content on the touch screen display, receive a first user input for selecting at least a portion of the content using the user interface, receive a second user input for adding at least a portion of the selected content to a clipboard using the user interface, check whether or not the application program associated with the second user input is the first application program, and allow or block the addition of the selected content to the clipboard based at least in part on the check.

The instructions may be set to allow the addition of at least a portion of the selected content to the clipboard if it is checked that the application program associated with the second user input is the first application program, and block the addition of at least a portion of the selected content to the clipboard if it is checked that the application program associated with the second user input is not the first application program.

The addition of at least a portion of the selected content to the clipboard may include copying or cutting out the at least a portion of the selected content.

At least one of the first user input or the second user input may include at least one of a touch input through the touch screen display, an audio input, or an input through an external device.

The instructions are set to display a notification (e.g., guidance information, at least partially including a text or an image) indicating the blocking through the touch screen display when the addition of at least a portion of the selected content to the clipboard is blocked.

According to various embodiments, an electronic device according to an embodiment may include a touch screen display, at least one processor operatively connected with the touch screen display, and a memory operatively connected with the at least one processor, in which the memory may store an application program including a user interface, and at least one processor may be configured to execute the application program, and display the user interface including at least one item of content, receive a user input for storing at least a portion of the content in a clipboard, determine whether or not the at least a portion of the content data is tampered with based on at least one item of information regarding the user input, store the at least a portion of the content data in the clipboard if it is determined that the at least a portion of the content data is not tampered with, and output a notification indicating that the at least a portion of the content data is tampered with without storing the at least a portion of the content data in the clipboard if it is determined that the at least a portion of the content data is tampered with.

The processor may be configured to store process information regarding the application program and determine that the at least a portion of the content data is tampered with if process information regarding processing of the user input and the stored process information correspond to each other, as at least part of the determining whether or not the at least a portion of the content data is tampered with.

The processor may be configured to store time information on a first user input for selecting the at least a portion of the content, and determine that the at least a portion of the content data is tampered with if time information on a second user input for storing the at least a portion of the content data and the stored time information have an interval equal to or greater than a specified threshold value, as at least part of the determining whether or not the at least a portion of the content data is tampered with.

The processor may be configured to track process information regarding the application program at a time of receiving the user input, and determine that the at least a portion of the content data is tampered with if the tracked process information does not include information regarding the user input, as part of the determining whether or not the at least a portion of the content data is tampered with.

The processor may be configured to generate information having a specified identifier at a time of receiving a first user input for selecting the at least a portion of the content to add the generated information to process information regarding the application program, track the process information at a time of receiving a second user input for storing the at least a portion of the content data, and determine that the at least a portion of the content data is tampered with if the process information does not include the information having the specified identifier, as at least part of the determining whether or not the at least a portion of the content data is tampered with.

The processor may be configured to count the number of times of receiving a second user input for storing the at least a portion of the content data within a specified time range from when a first user input for selecting the at least a portion of the content is received, and determine that the at least a portion of the content data is tampered with if a plurality of the second user inputs are received within the specified time range, as at least part of the determining whether or not the at least a portion of the content data is tampered with.

The notification may include at least one of an output of the user interface including at least one of a text, an image, or a symbol indicating that the at least a portion of the content data is tampered with, or a sound output indicating that the at least a portion of the content data is tampered with.

At least some of the functional operations of an electronic device (100 in FIG. 2A) described with reference to FIGS. 2B to 7 below may be performed under the control of a processor (150 in FIG. 2A) that is operated based on at least one instruction stored in a memory (130 in FIG. 2A). In addition, each of the embodiments of the data tampering determination described with reference to FIGS. 2B to 7 may be independently implemented. Alternatively, some embodiments may be implemented in combination with other embodiments.

Figure 2B:
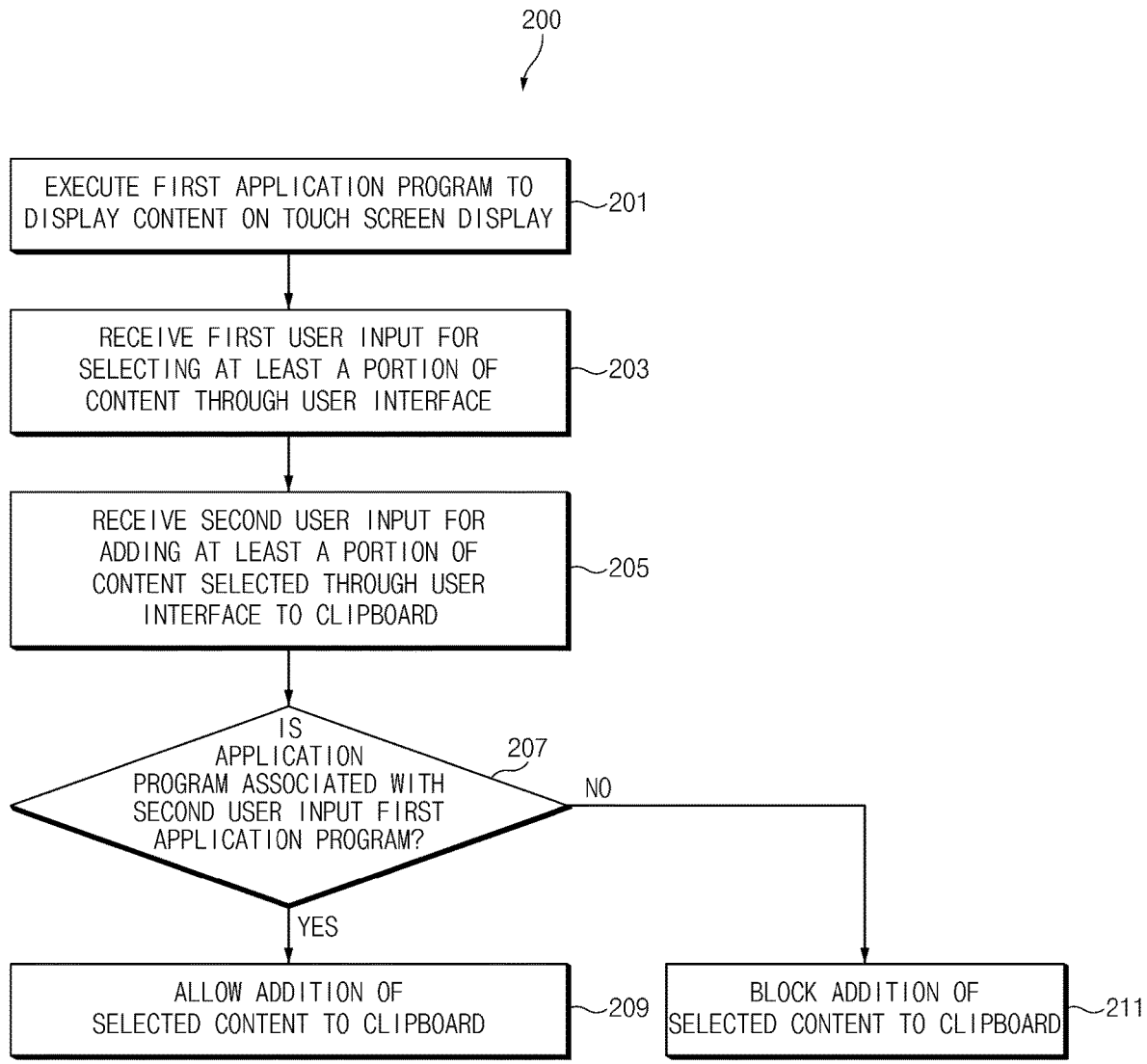
FIG. 2B is a diagram illustrating an example of a method for operating an electronic device with regard to data tampering, according to an embodiment.

FIG. 2B is a diagram illustrating an example of a method for operating an electronic device with regard to data tampering, according to an embodiment.

Referring to FIG. 2B, with regard to the method for operating an electronic device, the processor 150 of the electronic device 100 may execute a first application program to display content on the touch screen display in operation 201. The first application program may be, for example, a program including a function for inputting a text or an image, or a program for extracting a text or an image, such as a notepad, a web browser, a phone book, a chat program, a message application, and the like.

In operation 203, the processor 150 may receive the first user input for selecting at least a portion of the content through the user interface. The content may include, for example, financial related information, security-related information, address information, and the like. The first user input may include an input (e.g., touch drag, double touch, long touch, or the like) for selecting account information, password information, or the like, on a user interface (e.g., a content display screen).

In operation 205, the processor 150 may receive the second user input for adding at least a portion of the selected content to a clipboard through the user interface. The second user input may include, for example, an input for storing the selected content. In this regard, the processor 150 may output a menu for storing (or temporarily storing) content if the first user input is completed. The second user input may be an input for selecting 'store' included in the menu.

In operation 207, the processor 150 may check whether or not the program related to the second user input is associated with the first application program. For example, the processor 150 may check whether or not the second user input is an input generated in a state in which the first application program is being executed. Alternatively, the processor 150 may check whether or not the second user input is an input for requesting execution of an additional function associated with the first application program. Alternatively, the processor 150 may check whether or not the first user input is generated during executing the first application program and the second user input is generated within a specified time.

If the program related to the second user input is associated with the first application program in operation 207, the processor 150 may be configured to allow addition of the selected content to the clipboard in operation 209.

If the program related to the second user input is not associated with the first application program in operation 207, the processor 150 may be configured to block addition of the selected content to the clipboard in operation 211.

The processor 150 may prevent content from being written by hacked input while the content is being written to the clipboard, through the above-described check of second user input. For example, the processor 150 may discriminate input of content by hacking based on a temporal association between the first application program and the second user input or an association with an input relationship during program execution.

According to various embodiments, in operation 209, the processor 150 may be configured to allow the addition of at least a portion of the selected content to the clipboard if it is checked that the application program associated with the second user input is the first application program.

According to various embodiments, the processor 150 may be configured to perform a copying or cutting-out operation on the at least a portion of the selected content, with regard to the addition of at least a portion of the selected content to the clipboard.

According to various embodiments, in operation 211, the processor 150 may be configured to block the addition of at least a portion of the selected content to the clipboard if it is checked that the application program associated with the second user input is not the first application program.

According to various embodiments, the processor 150 may be configured to display a notification indicating the blocking through the touch screen display, with regard to the operation of blocking the addition of at least a portion of the selected content to the clipboard.

According to various embodiments, at least one of the first user input in operation 203 or the second user input in operation 205 may include at least one of a touch input through the touch screen display, an audio input, or an input through an external device.

Figure 3:
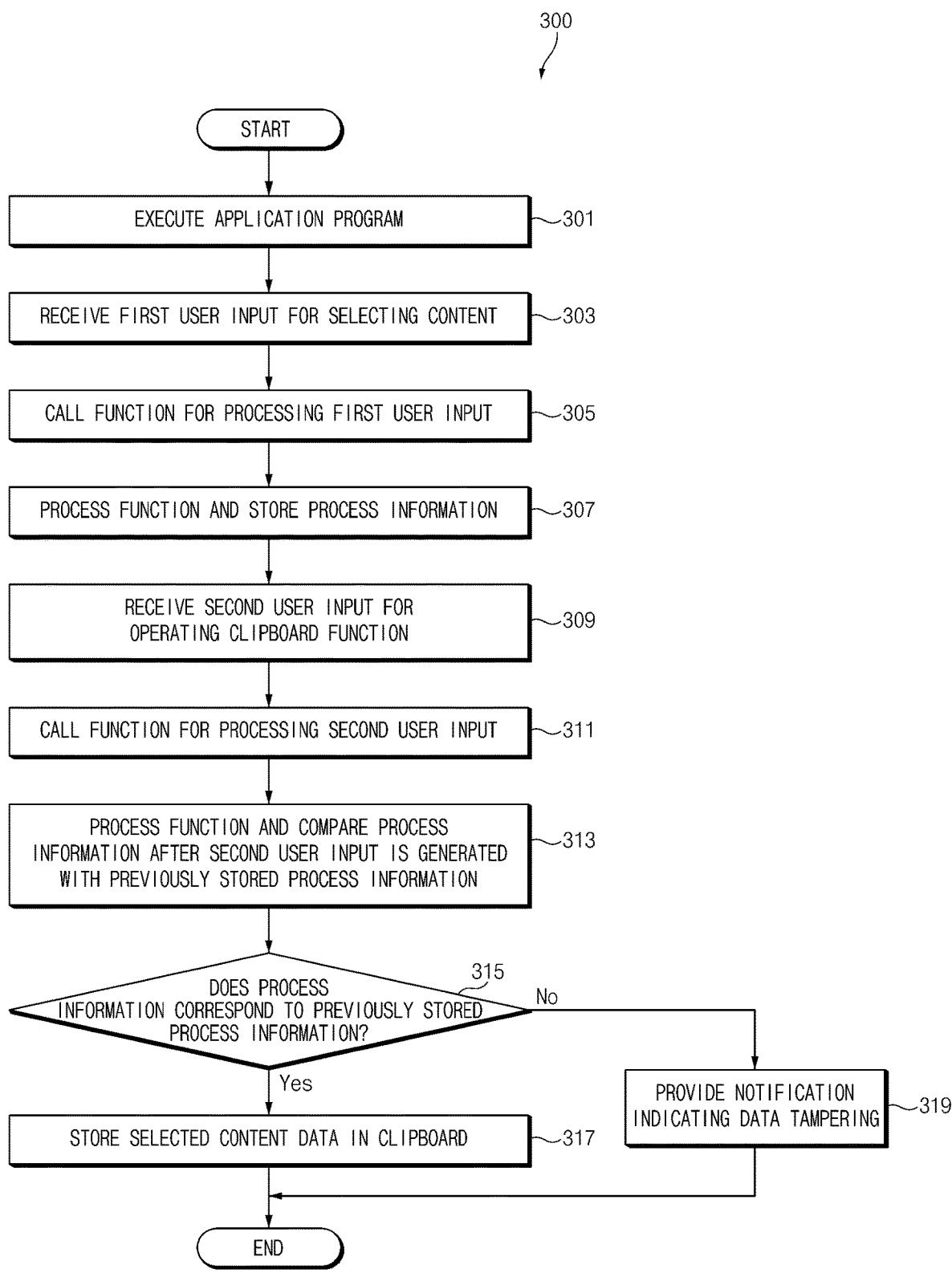
FIG. 3 is a diagram illustrating a method for determining data tampering by an electronic device according to a first embodiment.

FIG. 3 is a diagram illustrating a method 300 for determining data tampering by an electronic device according to a first embodiment.

Referring to FIGS. 2A and 3, in operation 301, the processor 150 of the electronic device 100 may execute the first application program. For example, the processor 150 may execute the first application program corresponding to user control or specified scheduling information from among at least one application program loaded or installed in the electronic device 100. In an embodiment, the first application program may include at least one user interface, and the user interface may display at least one item of content such as a text, an image, or the like (e.g., a still image or a video). According to an embodiment, in an operation in which the first application program is executed, a process for processing at least one function (or instruction) related to the operation of the first application program may be generated.

In operation 303, the processor 150 may receive the first user input for selecting a specific item in at least one item of content displayed on the user interface. For example, the processor 150 may receive a long press input applied to the specific part of the content through the display 140 (e.g., a touch screen display) for a specified time or longer. Alternatively, the processor 150 may receive a user voice input related to the specific part of the content through the input/output device 120 (e.g., a microphone). Alternatively, the processor 150 may receive a drag input for selecting the specific part of the content through an external input device (e.g., a mouse, a keyboard, or a touch pad) connected to the electronic device 100.

In operation 305, the processor 150 may call a function for processing the first user input. For example, the processor 150 may request that the operating system of the electronic device 100 transmits at least one function related to a touch event or a voice event and may receive it. In the operation, the determination engine 151 of the processor 150 may determine whether or not the at least one function is called by the generation of the first user input. For example, the determination engine 151 may determine whether or not the at least one function has been called in a normal manner (e.g., the generation of the first user input) by referring to whether or not the processor 150 receives an electrical signal related to the detection of the first user input from a touch panel (or a touch controller) or a microphone.

In operation 307, the processor 150 may process the at least one function transmitted from the operating system and may store process information generated when the first application program is executed. In this regard, the at least one function may include a function (or an instruction) for storing the process information (e.g., a process identifier (a process ID), an application program identifier (a package name), or the like) or storing the process information by encrypting it. The information management engine 152 of the processor 150 may identify and process the function for storing the process information, thereby making it possible to store the process information in the memory 130, for example, in the form of plist[pid].pname=package name.

In operation 309, the processor 150 may receive a second user input for operating a clipboard function supported by the electronic device 100. For example, the processor 150 may receive the second user input (e.g., touch input) applied to a copy tab button (e.g., 21 of FIG. 1) included in the object through the display 140. Alternatively, the processor 150 may receive a user voice input for selecting the copy tab button through the input/output device 120 (e.g., a microphone). Alternatively, the processor 150 may receive the touch input applied to the copy tap button through an external input device (e.g., a mouse, a keyboard, or a touch pad) connected to the electronic device 100.

In operation 311, the processor 150 may call a function for processing the second user input. For example, the processor 150 may request that the operating system of the electronic device 100 transmits at least one function related to a touch event or a voice event and may receive it.

In operation 313, the processor 150 may process the at least one function transmitted from the operating system, and may compare the process information (e.g., the process identifier (process ID), the application program identifier (package name), or the like) after the generation of the second user input with the process information previously stored in the memory 130. In this regard, the at least one function transmitted from the operating system with the generation of the second user input may include a function (instruction) for comparing an item of the process information stored during processing the first user input with an item of the process information after the generation of the second user input. The comparison engine 153 of the processor 150 may identify and process the function for comparing the above items of process information, thereby making it possible to determine whether or not the items of process information correspond to or match each other. In various embodiments, if some items of process information (e.g., the process identifier (process ID) or the application program identifier (package name)) are the same, the comparison engine 153 may determine that the items of process information correspond to or match each other. Alternatively, only if all items of process information (e.g., the process identifier (process ID) and the application program identifier (package name)) are the same, the comparison engine 153 may determine that the items of process information correspond to or match each other.

If it is determined in operation 315 that the process information previously stored in the memory 130 and the process information after the generation of the second user input correspond to or match each other, the processor 150 may store the data of the content selected by the first user input in a temporary storage space (e.g., a clipboard) in the memory 130 or a separate storage device (e.g., a cache memory) included in the memory 130, in operation 317.

Alternatively, if it is determined in operation 315 that the items of process information do not correspond to each other or do not match each other, the processor 150 may output a specified notification, in operation 319. For example, the processor 150 may output a user interface including a text, an image, or a symbol indicating that data of content selected by the user is at least partially tampered with or has a possibility of being tampered with. In addition, the processor 150 may exclude data storage of the selected content in the temporary storage space (e.g., the clipboard) in the memory 130 or the separate storage device (e.g., a cache memory) included in the memory 130.

Figure 4:
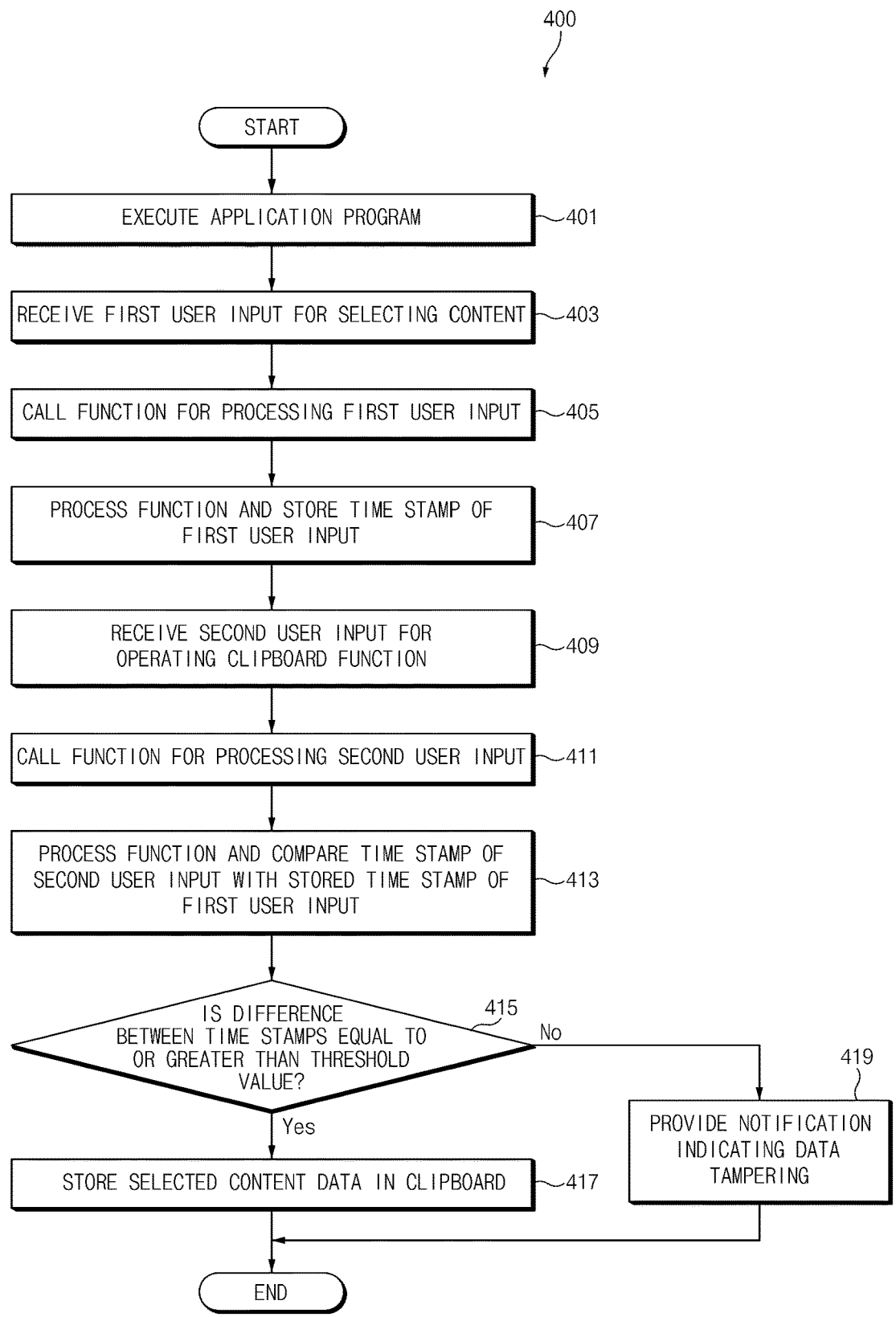
FIG. 4 is a diagram illustrating a method for determining data tampering by an electronic device according to a second embodiment.

FIG. 4 is a diagram illustrating a method for determining data tampering by an electronic device according to a second embodiment.

Referring to FIGS. 2A and 4, operation 401, operation 403, and operation 405 may correspond to operations 301, 303, and 305 described above with reference to FIG. 3, respectively, and descriptions thereof will not be repeated.

In operation 407, the processor 150 may process at least one function transmitted from the operating system in response to receiving the first user input for selecting content, and may store time stamp information of the first user input. In this regard, the at least one function transmitted from the operating system may include a function (or an instruction) for storing time stamp information on the time point when the first user input is generated. The information management engine 152 of the processor 150 may identify and process the function for storing the time stamp information, thereby making it possible to store, in the memory 130, the time stamp information on the first user input. In addition, the processor 150 may display, with a color, at least a portion of the content to which the first user input is applied by processing the at least one function, and may output an object (e.g., 20 in FIG. 20) supporting the operation of the clipboard function to the region adjacent to the content.

In operation 409 and operation 411, the processor 150 may receive the second user input for operating the clipboard function (e.g., a touch input or voice input for selecting a copy tab button (21 in FIG. 1) included in the object), or the like) and may call at least one function related to a touch event or a voice event from the operating system of the electronic device 100 in order to process the second user input.

In operation 413, the processor 150 may process the at least one function transmitted from the operating system, and may compare the time stamp information on the time point when the second user input is generated with the time stamp information on the first user input stored in the memory 130. In this regard, in order to process the second user input, the at least one function transmitted from the operating system may include a function (or an instruction) for comparing the previously stored time stamp information on the first user input with the time stamp information on the second user input. The comparison engine 153 of the processor 150 may identify and process the function for comparing the above items of time stamp information, thereby making it possible to calculate an interval time between the items of the time stamp information. The comparison engine 153 may compare the calculated interval time with a specified threshold value. As described above, it may be understood that the comparing of the calculated interval time with the specified threshold value takes it into account that the output of the object supporting the operation of the clipboard function (e.g., an object including a copy tab button) may be delayed if the data of the content selected by the first user input is tampered with due to a malicious program or the like after the first user input is generated. Alternatively, it may be understood that by setting a specified threshold value for the calculated interval time, a restriction on the time needed for a malicious program or the like to tamper with the content data is imposed.

If it is determined in operation 415 that the calculated interval time is equal to or greater than the specified threshold value, the processor 150 may store the data of the content selected by the first user input in a temporary storage space (e.g., the clipboard) in the memory 130 or a separate storage device (e.g., a cache memory) included in the memory 130, in operation 417.

Alternatively, if it is determined in operation 415 that the calculated interval time is less than the specified threshold value, the processor 150 may output a user interface including a text, an image, or a symbol indicating that data of the selected content is at least partially tampered with or has a possibility of being tampered with in operation 419. In addition, the processor 150 may exclude data storage of the selected content in the temporary storage space (e.g., the clipboard) in the memory 130 or the separate storage device (e.g., a cache memory) included in the memory 130.

In various embodiments, at least some of the operations 401 to 419 may be performed in association with the operations 301 to 319 described above with reference to FIG. 3. For example, in the processing of the at least one function for processing the first user input, the processor 150 may store process information generated when a first application program is executed and the time stamp information on the first user input. The processor 150 may compare the stored process information with the process information after the second user input is generated, and if it is determined that the two items of process information correspond to or match each other, may compare the time stamp information on the first user input with the time stamp information on the second user input to further determine whether or not the interval time between the time stamps corresponds to a specified threshold value or more. Only if the items of process information correspond to or match each other and the interval time between the time stamps falls less than the specified threshold value, the processor 150 may store the data of the content selected by the first user input in a temporary storage space (e.g., a clipboard) in the memory 130 or a separate storage device (e.g., a cache memory) included in the memory 130.

Figure 5:
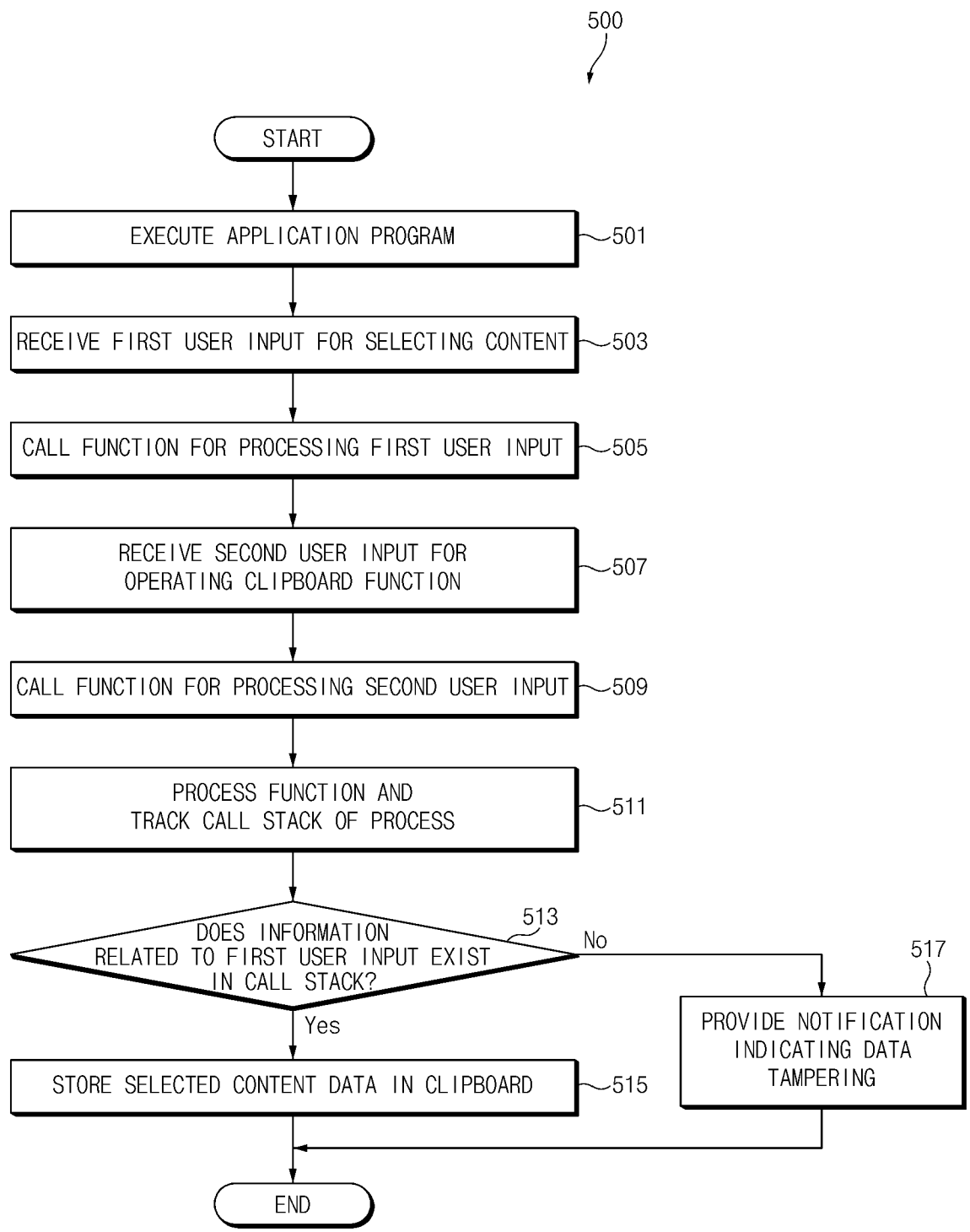
FIG. 5 is a diagram illustrating a method for determining data tampering by an electronic device according to a third embodiment.

FIG. 5 is a diagram illustrating a method for determining data tampering by an electronic device according to a third embodiment.

Referring to FIGS. 2A and 5, operation 501, operation 503, operation 505, operation 507, and operation 509 may correspond to operation 301, operation 303, operation 305, operation 309, and operation 311 described above with reference to FIG. 3, respectively, and descriptions thereof will not be repeated.

In operation 511, the processor 150 may process the at least one function transmitted from the operating system in order to process the second user input for selecting a copy tab button (e.g., 21 of FIG. 1) in an output object (e.g., 20 of FIG. 1), and may track a call stack of the process information generated when the first application program is executed. In this regard, it may be understood that the operation of tracking the call stack of the process is an operation of checking whether or not the storage of the data of the content in a temporary storage space (e.g., the clipboard) in the memory 130 or a separate storage device (e.g., a cache memory) included in the memory 130 is instructed in a normal manner (e.g., the generation of the second user input). In an embodiment, the at least one function may include a function (or an instruction) for tracking at least one item of thread information included in the process information generated when the first application program is generated. The tracking engine 154 of the processor 150 may identify and process the function for tracking at least one item of thread information included in the process, thereby making it possible to check whether or not the process includes thread information related to the second user input. Alternatively, the tracking engine 154 may further check whether or not thread information related to the second user input has a call stack line number specified in the process.

If it is checked in operation 513 that the process includes the thread information of the specified call stack line number related to the second user input, the processor 150 may store the data of the content selected by the first user input in a temporary storage space (e.g., the clipboard) in the memory 130 or a separate storage device (e.g., a cache memory) included in the memory 130, in operation 515. Alternatively, when it is checked in operation 513 that the process information does not include the thread information related to the second user input or that the thread information related to the second user input does not have the specified call stack line number, the processor 150 may output a user interface including a text, an image, or a symbol indicating that the data of the selected content is at least partially tampered with or has a possibility of being tampered with in operation 517. In addition, the processor 150 may exclude data storage of the selected content in the temporary storage space (e.g., the clipboard) in the memory 130 or the separate storage device (e.g., a cache memory) included in the memory 130.

Figure 6:
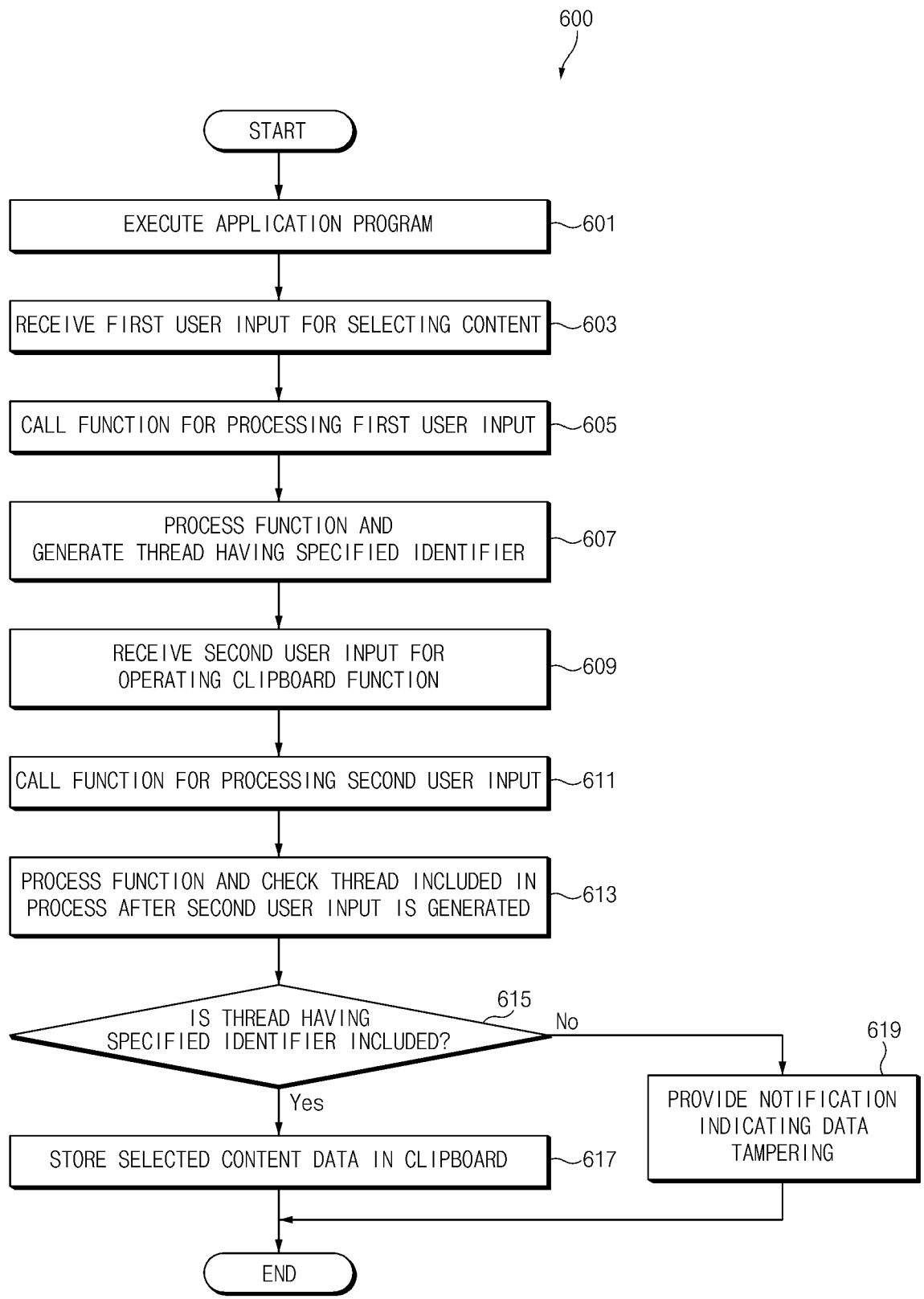
FIG. 6 is a diagram illustrating a method for determining data tampering by an electronic device according to a fourth embodiment.

FIG. 6 is a diagram illustrating a method for determining data tampering by an electronic device according to a fourth embodiment.

Referring to FIGS. 2A and 6, operation 601 and operation 603 may correspond to operation 301 and operation 303 described above with reference to FIG. 3, respectively, and descriptions thereof will not be repeated.

In operation 605, the processor 150 may call a function for processing the first user input for selecting content. For example, the processor 150 may request that the operating system of the electronic device 100 transmits at least one function related to the processing of the first user input and may receive it. In the operation, the processor 150 may further request the operating system to generate an identifier (e.g., a thread name), and may receive identifier information generated by the operating system. In an embodiment, the identifier generated by the operating system may include a random string that may be generated only by the operating system. Alternatively, the identifier may include a random string obtained by encrypting a random string generated by the operating system in a security program executed under a call of the operating system. In an embodiment, the operating system may generate a new identifier whenever the processor 150 requests the operating system to generate an identifier in response to receiving the first user input for selecting any content.

In operation 607, the processor 150 may process the at least one function transmitted from the operating system, and may generate a dummy thread having a specified identifier. In this regard, the at least one function transmitted from the operating system may include a function (or an instruction) for generating the dummy thread having the specified identifier. The generation engine 155 of the processor 150 may identify and process a function for generating the dummy thread of the specified identifier, thereby making it possible to generate a dummy thread having an identifier transmitted from the operating system. The generation engine 155 may include the generated dummy thread in a process generated when the first application program is executed. In addition, the processor 150 may display, with a color, at least a portion of the content to which the first user input is applied by processing the at least one function, and may output an object (e.g., 20 in FIG. 20) supporting the operation of the clipboard function to the region adjacent to the content.

In operation 609 and operation 611, the processor 150 may receive the second user input (e.g., touch input through the display 140, voice input through the microphone, or touch input through, touch input through an external input device, or the like) for selecting a copy tab button (e.g., 21 in FIG. 1) included in the object, and may call at least one function related to a touch event or a voice event from the operating system of the electronic device 100.

In operation 613, the processor 150 may process at least one function transmitted from the operating system in response to receiving the second user input and may check process information after the second user input is generated. In this regard, at least one function transmitted from the operating system may include a function (or an instruction) for tracking at least one item of thread information included in the process. The tracking engine 154 of the processor 150 may identify and process the function for tracking at least one item of thread information included in the process, thereby making it possible to check whether or not the process includes the dummy thread having the identifier (or information including at least the identifier) transmitted from the operating system.

If it is checked in operation 615 that the process includes the thread having the specified identifier (e.g., the identifier generated by the operating system), the processor 150 may store the data of the content selected by the first user input in a temporary storage space (e.g., the clipboard) in the memory 130 or a separate storage device (e.g., a cache memory) included in the memory 130, in operation 617.

Alternatively, if it is checked in operation 615 that the process does not include the thread having the specified identifier, the processor 150 may output a user interface including a text, an image, or a symbol indicating that data of the selected content is at least partially tampered with or has a possibility of being tampered with in operation 619. In addition, the processor 150 may exclude data storage of the selected content in the temporary storage space (e.g., the clipboard) in the memory 130 or the separate storage device (e.g., a cache memory) included in the memory 130.

Figure 7:
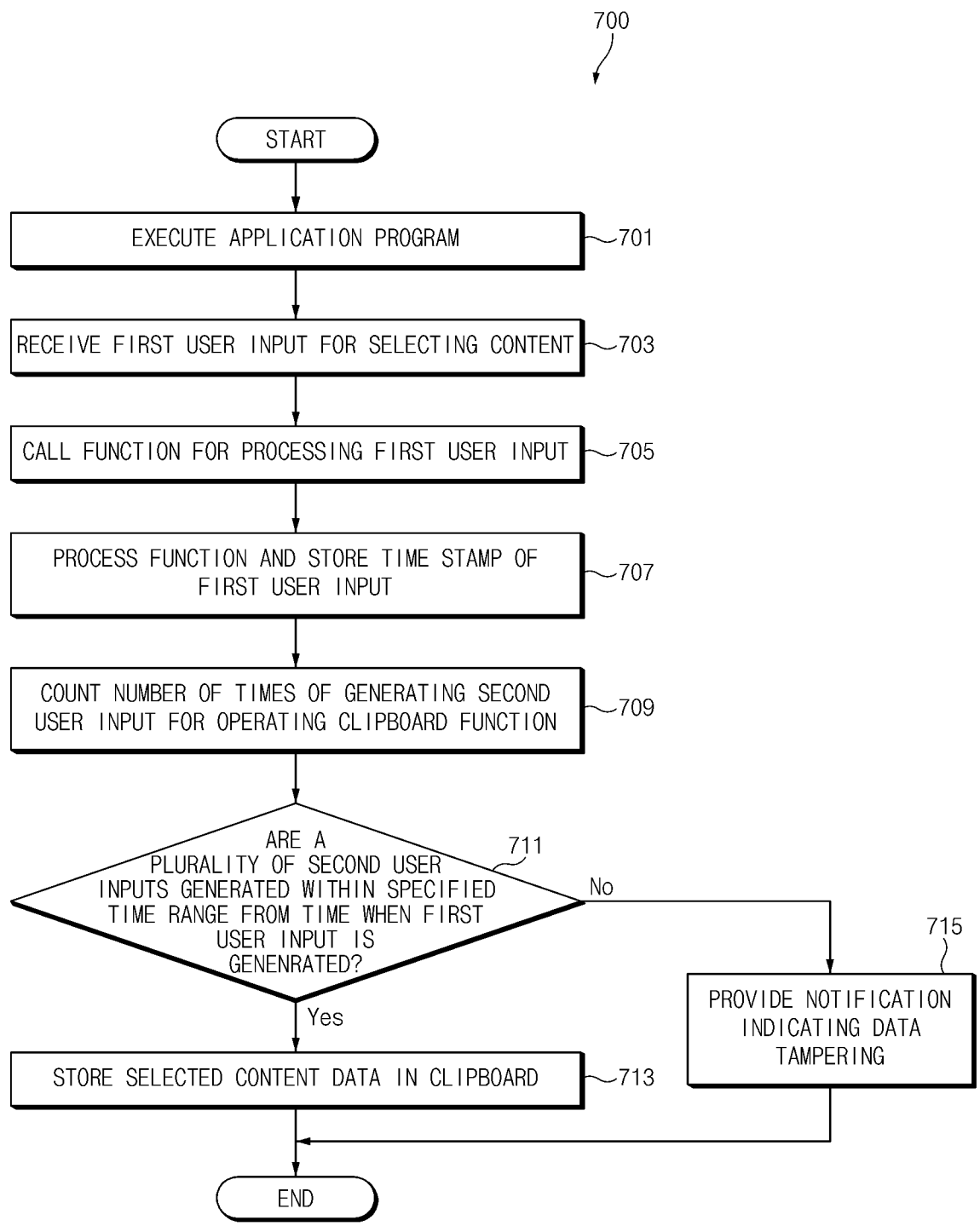
FIG. 7 is a diagram illustrating a method for determining data tampering by an electronic device according to a fifth embodiment.

FIG. 7 is a diagram illustrating a method for determining data tampering by an electronic device according to a fifth embodiment.

Referring to FIGS. 2A and 7, operation 701, operation 703, and operation 705 may correspond to operations 301, 303, and 305 described above with reference to FIG. 3, respectively, and descriptions thereof will not be repeated.

In operation 707, the processor 150 may process at least one function transmitted from the operating system in response to receiving the first user input for selecting content and may store time stamp information of the first user input. The information management engine 152 of the processor 150 may identify and process the function for storing the time stamp information, of the at least one function, thereby making it possible to store, in the memory 130, the time stamp information on the first user input. In addition, the processor 150 may display, with a color, at least a portion of the content to which the first user input is applied by processing the at least one function, and may output an object (e.g., 20 in FIG. 20) supporting the operation of the clipboard function to the region adjacent to the content.

In operation 709, the comparison engine 153 of the processor 150 may count the number of times of generating the second user input (e.g., touch input, voice input, or the like, for selecting a copy tab button (21 in FIG. 1)) included in the object) for operating the clipboard function. For example, the comparison engine 153 may determine whether or not a plurality of second user inputs are generated within a specified time range based on the time indicated by the time stamp of the first user input. In an embodiment, the specified time range may be set by the processor 150 or user control in consideration of an elapsed time from when the function in response to receiving the first user input is called until the function in response to receiving the second user input is called.

If it is determined in operation 711 that a plurality of second user inputs are not generated within a specified time range from the time stamp time of the first user input, the processor 150 may store the data of the content selected by the first user input in a temporary storage space (e.g., a clipboard) in the memory 130 or a separate storage device (e.g., a cache memory) included in the memory 130, in operation 713.

Alternatively, if it is determined in operation 711 that a plurality of second user inputs are generated within a specified time range from the time stamp time of the first user input, the processor 150 may output a user interface including a text, an image, or a symbol indicating that data of the selected content is at least partially tampered with or has a possibility of being tampered with in operation 715. In addition, the processor 150 may exclude data storage of the selected content in the temporary storage space (e.g., the clipboard) in the memory 130 or the separate storage device (e.g., a cache memory) included in the memory 130.

Figure 8:
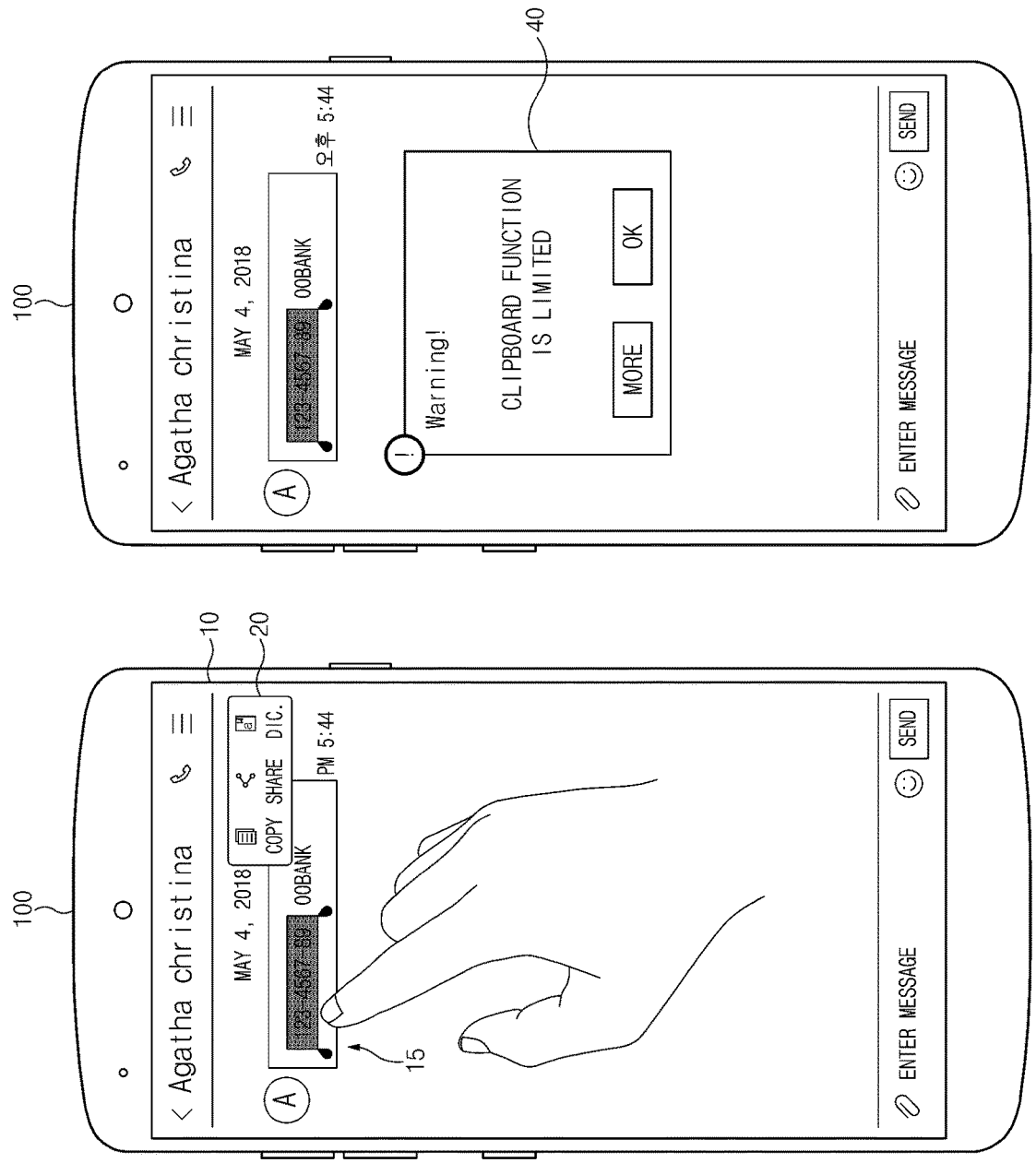
FIG. 8 is a diagram illustrating a user interface of an electronic device according to an embodiment.

FIG. 8 is a diagram illustrating a user interface of an electronic device according to an embodiment.

Referring to FIG. 8, the electronic device 100 may output a user interface 40 having a specified form, according to a result of determining whether or not content data with regard to the operation of the clipboard function (e.g., data of the content to which the long press input of the user is applied) is tampered with. For example, the electronic device 100 may output the user interface 40 if it is determined that the content data is at least partially tampered with or has a possibility of being tampered with by the method for determining data tampering described above with reference to FIGS. 3 to 7. In an embodiment, the user interface 40 may include a text (e.g., "data tampering is detected" or "clipboard function is limited", and so on), an image, a symbol, or the like specifying the tampering or possibility of tampering with the content data. In an embodiment, the electronic device 100 may further output a specified notification sound or a sound for uttering the text through the speaker together with the output of the user interface 40. In various embodiments, the user interface 40 may include a specified tap button (e.g., detail), and the electronic device 100 may diagnose or treat a malicious program or the like caused by the tampering with the content data by executing a vaccine program that is loaded, in response to a user input (e.g., touch) applied to the tap button.

According to various embodiments described above, a method for determination of tampering with data according to an embodiment may include displaying a user interface including at least one item of content by executing an application program; receiving a user input for storing at least a portion of the content in a clipboard, and determining whether or not the at least a portion of the content data is tampered with based on at least one item of information regarding the user input.

The method may further include storing the at least a portion of the content data in the clipboard if it is determined that the at least a portion of the content data is not tampered with, and outputting a notification indicating that the at least a portion of the content data is tampered with if it is determined that the at least a portion of the content data is tampered with.

The determining whether or not the at least a portion of the content data is tampered with may include storing process information regarding the application program, comparing process information regarding processing of the user input with the stored process information, and determining that the at least a portion of the content data is tampered with if the process information regarding processing of the user input and the stored process information correspond to each other.

The determining whether or not the at least a portion of the content data is tampered with may include storing time information on a first user input for selecting the at least a portion of the content, comparing time information on a second user input for storing the at least a portion of the content data with the stored time information, and determining that the at least a portion of the content data is tampered with if the time information on the second user input and the stored time information have an interval equal to or greater than a specified threshold value.

The determining whether or not the at least a portion of the content data is tampered with may include tracking process information regarding the application program at a time of receiving the user input, and determining that the at least a portion of the content data is tampered with if the process information does not include information regarding the user input.

The determining whether or not the at least a portion of the content data is tampered with may include generating information having a specified identifier at a time of receiving a first user input for selecting the at least a portion of the content to add the generated information to process information regarding the application program, tracking the process information at a time of receiving a second user input for storing the at least a portion of the content data, and determining that the at least a portion of the content data is tampered with if the process information does not include the information having the specified identifier.

The determining whether or not the at least a portion of the content data is tampered with may include counting the number of times of receiving a second user input for storing the at least a portion of the content data within a specified time range from when a first user input for selecting the at least a portion of the content is received, and determining that the at least a portion of the content data is tampered with if a plurality of the second user inputs are received within a specified time range.

The outputting of the notification may include at least one of outputting a user interface including at least one of a text, an image, or a symbol indicating that the at least a portion of the content data is tampered with, and outputting a sound indicating that the at least a portion of the content data is tampered with.

Figure 9:
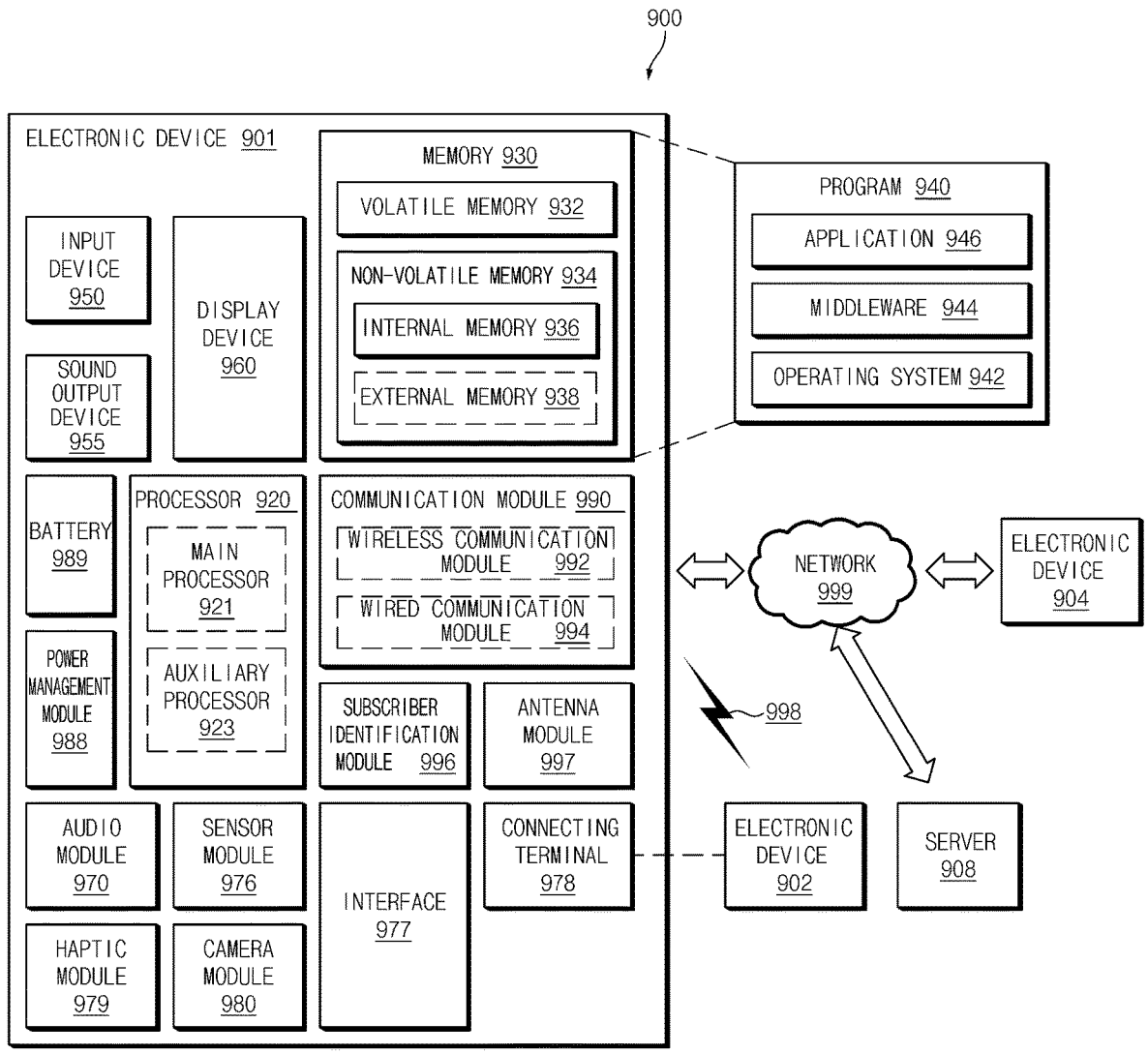
FIG. 9 is a diagram illustrating an electronic device in a network environment according to an embodiment; and With respect to the description of the drawings, the same reference numbers may be assigned for the same or corresponding elements.

FIG. 9 is a block diagram illustrating an electronic device 901 in a network environment 900 according to various embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector), The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration.

According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a touch screen display;
at least one processor operatively connected with the touch screen display; and
memory operatively connected with the at least one processor,
wherein the memory stores an application program including a user interface, and
at least one processor is configured to:
execute the application program, and display the user interface including content data accompanying the execution of the application program;
receive a second user input for storing at least a portion of the content data in a clipboard; and
determine whether or not the at least a portion of the content data is tampered with, wherein the determining is based on:
storing a first process identifier regarding the application program, comparing a second process identifier regarding processing of the second user input with the stored first process identifier, and determining that the at least a portion of the content data is tampered with if the second process identifier regarding processing of the second user input does not correspond with the stored first process identifier;
storing time information on a first user input for selecting the at least a portion of the content data, comparing time information on the second user input for storing the at least a portion of the content data with the stored time information, and determining that the at least a portion of the content data is tampered with if an interval between the time information on the second user input and the stored time information is equal to or greater than a specified threshold value;
tracking process information regarding the application program at a time of receiving the second user input, and determining that the at least a portion of the content data is tampered with if the tracked process information does not include information regarding the second user input;
generating information having a specified identifier at a time of receiving the first user input for selecting the at least a portion of the content data to add the generated information to process information regarding the application program, tracking the process information at a time of receiving the second user input for storing the at least a portion of the content data, and determining that the at least a portion of the content data is tampered with if the tracked process information does not include the information having the specified identifier; and
counting the number of times of receiving the second user input for storing the at least a portion of the content data within a specified time range from when the first user input for selecting the at least a portion of the content data is received, and determining that the at least a portion of the content data is tampered with if the number of times of receiving is equal to or greater than a specified value.

2. The electronic device of claim 1, wherein the at least a portion of the content data is determined to be tampered with if the interval the between time information on the second user input and the stored time information is equal to or greater than the specified threshold value.

3. The electronic device of claim 1, wherein the at least a portion of the content data is determined to be tampered with if the tracked process information does not include the information regarding the second user input.

4. The electronic device of claim 1, the at least a portion of the content data is determined to be tampered with if the tracked process information does not include the information having the specified identifier.

5. The electronic device of claim 1, wherein the at least a portion of the content data is determined to be tampered with if the number of times of receiving is equal to or greater than the specified value.

6. The electronic device of claim 1, wherein a notification includes at least one of an output of the user interface including at least one of a text, an image, or a symbol indicating that the at least a portion of the content data is tampered with, or a sound output indicating that the at least a portion of the content data is tampered with.

7. A method for determining data tampering by an electronic device, the method comprising:
displaying a user interface including content data in response to execution of an application program;
receiving a second user input for storing at least a portion of the content data in a clipboard; and
determining whether or not the at least a portion of the content data is tampered with based on at least one item of information regarding the second user input,
wherein the determining whether or not the at least a portion of the content data is tampered with includes:
storing a first process identifier regarding the application program, comparing a second process identifier regarding processing of the second user input with the stored first process identifier, and determining that the at least a portion of the content data is tampered with if the second process identifier regarding processing of the second user input does not correspond with the stored first process identifier;

storing time information on a first user input for selecting the at least a portion of the content data, comparing time information on the second user input for storing the at least a portion of the content data with the stored time information, and determining that the at least a portion of the content data is tampered with if an interval between the time information on the second user input and the stored time information is equal to or greater than a specified threshold value;

tracking process information regarding the application program at a time of receiving the second user input, and determining that the at least a portion of the content data is tampered with if the tracked process information does not include information regarding the second user input;

generating information having a specified identifier at a time of receiving the first user input for selecting the at least a portion of the content data to add the generated information to process information regarding the application program, tracking the process information at a time of receiving the second user input for storing the at least a portion of the content data, and determining that the at least a portion of the content data is tampered with if the tracked process information does not include the information having the specified identifier; and counting the number of times of receiving the second user input for storing the at least a portion of the content data within a specified time range from when the first user input for selecting the at least a portion of the content data is received, and determining that the at least a portion of the content data is tampered with if the number of times of receiving is equal to or greater than a specified value.

8. The method for determining data tampering by an electronic device of claim 7, further comprising:

storing the at least a portion of the content data in the clipboard if it is determined that the at least a portion of the content data is not tampered with; and outputting a notification indicating that the at least a portion of the content data is tampered with if it is determined that the at least a portion of the content data is tampered with, wherein the outputting of the notification includes at least one of:

outputting a user interface including at least one of a text, an image, or a symbol indicating that the at least a portion of the content data is tampered with; and outputting a sound indicating that the at least a portion of the content data is tampered with.

* * * * *